US011958363B2

(12) United States Patent
Saberwal et al.

(10) Patent No.: US 11,958,363 B2
(45) Date of Patent: Apr. 16, 2024

(54) SYSTEM AND METHOD OF DETERMINING A REPRESENTATIVE MEASUREMENT FROM MULTIPLE INDEPENDENT MEASUREMENTS OF ELECTRIC MACHINE SPEED

(71) Applicant: FORD GLOBAL TECHNOLOGIES, LLC, Dearborn, MI (US)

(72) Inventors: Dev Saberwal, Farmington Hills, MI (US); Christopher Golecki, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 556 days.

(21) Appl. No.: 16/952,731

(22) Filed: Nov. 19, 2020

(65) Prior Publication Data

US 2022/0063418 A1    Mar. 3, 2022

Related U.S. Application Data

(60) Provisional application No. 63/073,857, filed on Sep. 2, 2020.

(51) Int. Cl.
| | |
|---|---|
| *B60L 15/00* | (2006.01) |
| *B60K 1/02* | (2006.01) |
| *B60L 15/20* | (2006.01) |
| *G05D 13/62* | (2006.01) |
| *H02P 5/74* | (2006.01) |

(52) U.S. Cl.
CPC ............... *B60L 15/20* (2013.01); *B60K 1/02* (2013.01); *G05D 13/62* (2013.01); *H02P 5/74* (2013.01); *B60L 2240/421* (2013.01)

(58) Field of Classification Search
CPC ..... B60L 15/20; B60L 2240/421; B60K 1/02; G05D 13/62; H02P 5/74
See application file for complete search history.

(56) References Cited

U.S. PATENT DOCUMENTS

| | | | | |
|---|---|---|---|---|
| 6,806,667 B1 * | 10/2004 | Sasaki | ................... | B60K 6/547 |
| | | | | 318/434 |
| 9,115,803 B2 | 8/2015 | Fujii et al. | | |
| 2002/0109100 A1 | 8/2002 | Jackson, III et al. | | |
| 2010/0222953 A1 * | 9/2010 | Tang | ..................... | B60W 10/08 |
| | | | | 701/22 |
| 2011/0062909 A1 * | 3/2011 | Patel | ...................... | H02P 6/181 |
| | | | | 180/65.285 |
| 2015/0127202 A1 * | 5/2015 | Itou | ......................... | B60L 15/20 |
| | | | | 701/22 |

* cited by examiner

*Primary Examiner* — Truc M Do
(74) *Attorney, Agent, or Firm* — David B Kelley; Brooks Kushman P.C.

(57) ABSTRACT

A vehicle includes first and second electric machines constrained to rotate in unison and configured to power a common axle. A controller is programmed to, in response to activation of the vehicle, select one of the first and second speed sensors as a representative speed sensor, and, in response to the electric machines being in speed control, command speeds to the first and second electric machines based on a difference between a target speed of the electric machines and a measured speed of the representative speed sensor.

18 Claims, 3 Drawing Sheets

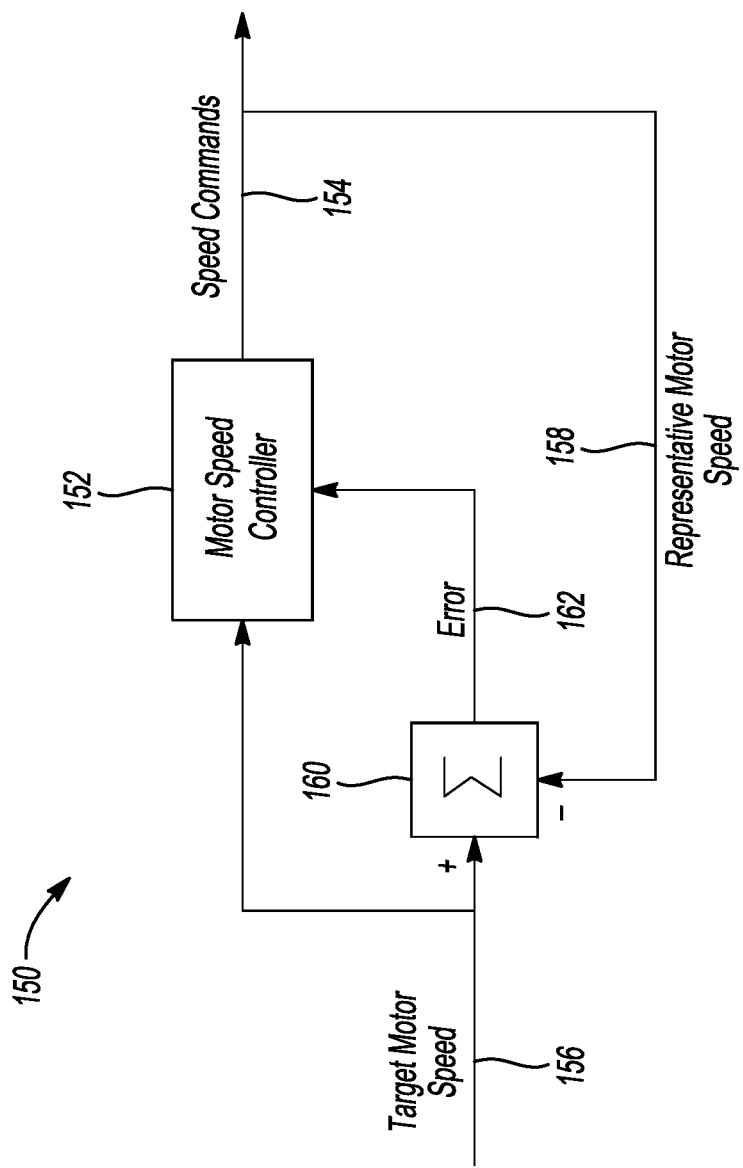

SYSTEM AND METHOD OF DETERMINING A REPRESENTATIVE MEASUREMENT FROM MULTIPLE INDEPENDENT MEASUREMENTS OF ELECTRIC MACHINE SPEED

CROSS-REFERENCE TO RELATED APPLICATIONS

This application claims the benefit of U.S. provisional application Ser. No. 63/073,857 filed Sep. 02, 2020 the disclosure of which is hereby incorporated in its entirety by reference herein.

TECHNICAL FIELD

The present disclosure relates electric vehicles having multiple electric machines powering a same axle, and more specifically to systems and methods of selecting a representative one of independent measurements from the multiple electric machines.

BACKGROUND

Electrified vehicles, such as fully electric and hybrid electric vehicles, include at least one electric machine for propelling the vehicle. The electric machine is powered by a traction battery that supplies energy to the electric machine, which reduces a state of charge (SOC) of the battery. Many electrified vehicles are capable of regenerative braking to recharge the battery by converting mechanical power into electrical power.

BRIEF DESCRIPTION OF THE DRAWINGS

FIG. 3 is a control diagram of an algorithm for controlling the electric machines in speed control.

SUMMARY

Figure 1:
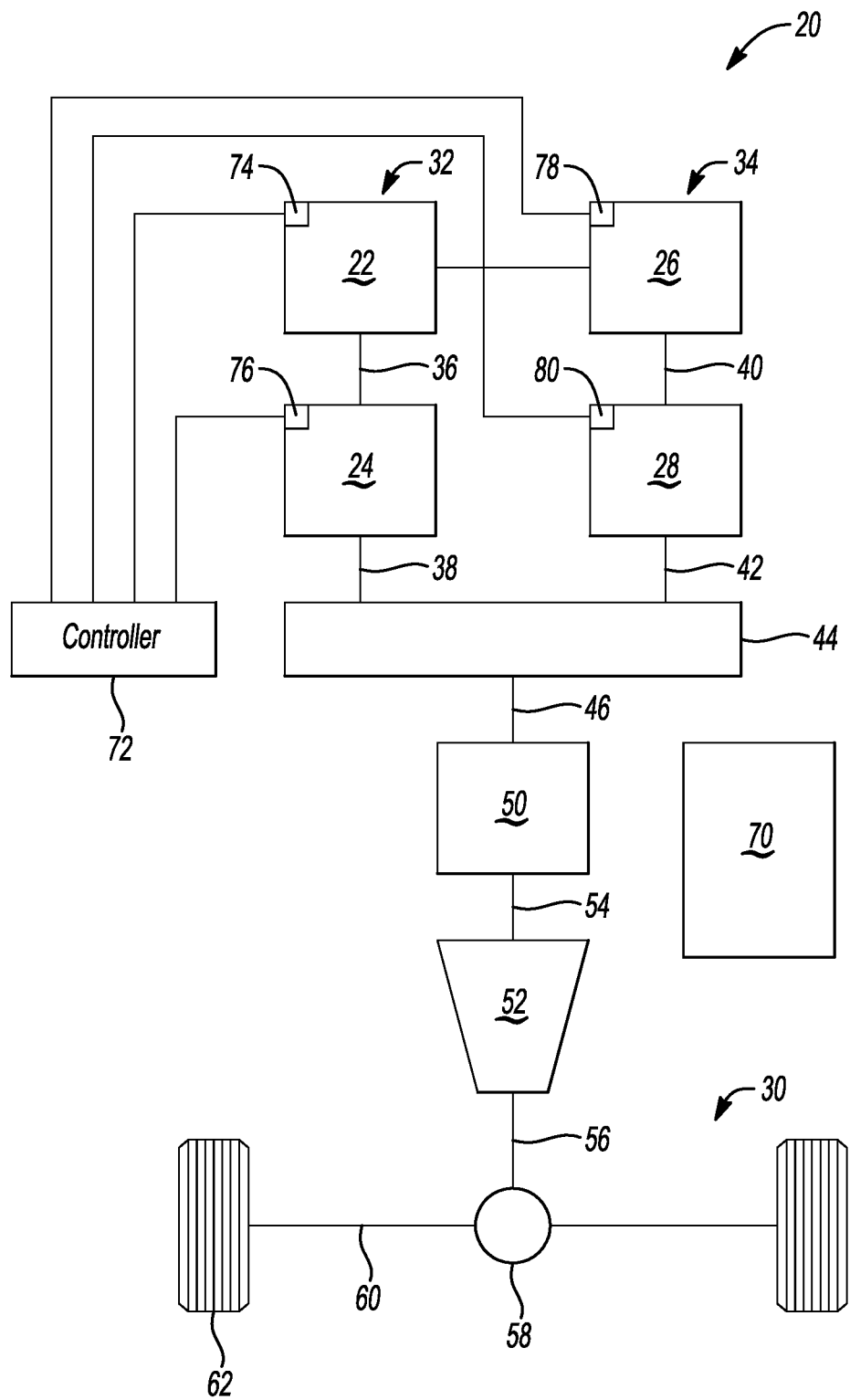
FIG. 1 is a diagrammatical view of an electric vehicle.

According to one embodiment, a vehicle includes first and second electric machines constrained to rotate in unison and configured to power a common axle. A controller is programmed to, in response to the electric machines being in speed control, command speeds to the first and second electric machines based on a difference between a target speed of the electric machines and a measured speed from a selected one of first and second speed sensors, wherein a ratio of speed values detected by the selected one and average speed values detected by the first and second sensors is less than the ratio of the other of the first and second sensors.

According to another embodiment, a vehicle includes a driven axle and first and second electric machines configured to power the driven axle. The electric machines have rotor shafts constrained to rotate in unison, and the first and second electric machines have first and second speed sensors, respectively. a controller is programmed to, in response to activation of the vehicle, select one of the first and second speed sensors having a greatest number of accumulated points for a predefined sampling duration, wherein the accumulated points for each of the first and second speed sensors is based on (i) a variance that is a ratio of a speed value for the speed sensor and an average speed value for both of the speed sensors and (ii) a noise factor associated with the speed sensor. The controller is further programmed to, in response to the electric machines being in speed control, command speeds to the first and second electric machines based on a difference between a target speed of the electric machines and a measured speed of the one of the first and second speed sensors but not the other of the first and second speed sensors.

According to yet another embodiment, a method of speed controlling an electric vehicle having first and second electric machines joined to rotate in unison is disclosed. The method includes, during a sampling period, selecting one of first and second speed sensors as having a greatest number of accumulated points awarded based on a difference between a speed value for the speed sensor and an average speed for both of the speed sensors and a noise factor associated with the speed sensor. The method further includes, in response to the electric machines being in speed control, commanding speeds to the first and second electric machine based on a difference between a target speed of the electric machines and a measured speed of the one of the first and second speed sensors but not the other of the first and second speed sensors.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIG. 1, an electric vehicle 20, such as a high-performance electric vehicle, includes multiple electric machines powering a same axle. In the illustrated embodiment, the vehicle 20 includes four electric machines (22, 24, 26, and 28) that power a same axle such as rear axle 30. The electric machines may be arranged in two parallel stacks 32, 34 with the machines 22 and 24 arranged in series and the electric machines 26 and 28 arranged in series. Each of the electric machines may be an electric motor capable of acting as a motor to propel the vehicle 20 and as a generator to perform regenerative braking. For example, the electric machines may be a three-phase alternating current (AC) machines. For easy description, the electric machines may be referred to as "motors" with the understand that the motors are capable of acting as motors and as generators. Each of the electric machines may include a stator and a rotor supported for rotation within the stator by a rotor shaft. The rotor shaft 36 of the electric machine 22 is coupled to the rotor shaft 38 of the electric machine 24, and the rotor shaft 40 of the electric machine 26 is coupled to the rotor shaft 42 of the electric machine 28. The rotor shaft 38 is configured to output torque and power of the electric machines 22 and 24, and the rotor shaft 42 is configured to output the combined torque and power of the electric machines 26 and 28.

A gearbox 44, or other suitable mechanism, is configured to receive the power from the motor stacks 32 and 34 and combine them as a single output at output shaft 46. The gearbox 44 may be referred to as a summing gearbox. The gearbox 44 may include a gearing arrangement that is configured to rotationally constrain the stacks 32 and 34 so that all of the electric machines are rotationally coupled in a fixed relationship in at least some operating condition of the gearbox 44. In some embodiments, the gearbox 44 may include clutches, or other mechanisms, that allow independent rotation between the stacks 32, 34 in at least some operating conditions; in others, they are allows rotationally fixed. The gearing arrangement of the gearbox 44 may include a speed reduction between the input and the output shaft 46 or may be 1:1 (direct drive).

The vehicle 20 may include a launch device 50 and a transmission 52. The transmission 52 may be a single speed or a multispeed transmission, such as a two-speed, a three-speed, a four-speed, etc. The launch device 50 may be a fluid coupling such as a torque converter. In the example of a torque converter, an impeller is rotationally coupled to the output shaft 46 and a turbine is rotationally coupled to an input shaft 54 of the transmission 52. The impeller and the turbine are configured to fluid couple to transfer torque from the output shaft 46 to the input shaft 54. The transmission 52 includes an output shaft 56 that is connected with a differential 58. The differential 58 is configured to receive power from the output shaft 56 and direct that power between the axle shafts 60 to power the driven wheels 62. The torque converter 50 is not required and the output shaft 46 of the gearbox 44 may be directly connected to the input shaft 54 of the transmission 52 in some embodiments. Including the torque converter 50 provides a torque multiplication at launch and may be advantageous in implementations. The torque converter 50 may include a bypass clutch in some embodiments.

The electric machines may be powered by one or more traction batteries, such as traction battery 70. The traction battery 70 stores energy that can be used by the electric machines. The traction battery 70 typically provides a high-voltage direct current (DC) output from one or more battery cell arrays, sometimes referred to as battery cell stacks, within the traction battery 70. The battery cell arrays include one or more battery cells. The battery cells, such as a prismatic, pouch, cylindrical, or any other type of cell, convert stored chemical energy to electrical energy. The cells may include a housing, a positive electrode (cathode), and a negative electrode (anode). An electrolyte allows ions to move between the anode and cathode during discharge, and then return during recharge. Terminals may allow current to flow out of the cell for use by the vehicle 20. Different battery pack configurations may be available to address individual vehicle variables including packaging constraints and power requirements. The battery cells may be thermally regulated with a thermal management system.

The traction battery 70 may be electrically connected to one or more power-electronics modules through one or more contactors or relays. The module may be electrically connected to the electric machines and may provide the ability to bi-directionally transfer electrical energy between the traction battery 70 and the electric machines. For example, a typical traction battery 70 may provide a DC voltage while the electric machines may require a three-phase AC voltage to function. The power-electronics module may convert the DC voltage to a three-phase AC voltage as required by the electric machines. In a regenerative mode, the power-electronics module may convert the three-phase AC voltage from the electric machines acting as generators to the DC voltage required by the traction battery 70.

The vehicle 20 includes a controller 72 in electric communication with a plurality of vehicle systems and is configured to coordinate functionality of the vehicle. The controller 72 may be a vehicle-based computing system that includes one or more controllers that communicate via a serial bus (e.g., controller area network (CAN)) or via dedicated electrical conduits. The controller 72 generally includes any number of microprocessors, ASICs, ICs, memory (e.g., FLASH, ROM, RAM, EPROM and/or EEPROM) and software code to co-act with one another to perform a series of operations. The controller 72 also includes predetermined data, or "lookup tables" that are based on calculations and test data, and are stored within the memory. The controller 72 may communicate with other vehicle systems and controllers over one or more wired or wireless vehicle connections using common bus protocols (e.g., CAN and LIN). Used herein, any reference to "a controller" refers to one or more controllers. The controller 72 may include battery energy control module (BECM) that operates at least the traction battery, a powertrain control module (PCM) that operates at least the electric machines, and other systems.

Each of the electric machines may include speed sensor (such as speed sensors 74, 76, 78, and 80) that are in electric communication with the controller 72 and are configured to output speed signals (sometimes referred to as "motor speed signals") indicative of a measured speed of the electric machine. The controller 72 is configured to use these speed signals to control operation of the electric powertrain. In order to properly control the powertrain, the controller needs accurate data for the speed signal of each motor. In the illustrated embodiment, all of the electric machines are rotationally constrained to rotate at the same speed. Therefore, the measurements of the speed sensors should all be the same. In practice, however, variations in the speed signals may occur for a variety of factors. As such, a control strategy is needed to identify a representative electric-machine speed to be used for relevant controller calculations.

Figure 2:
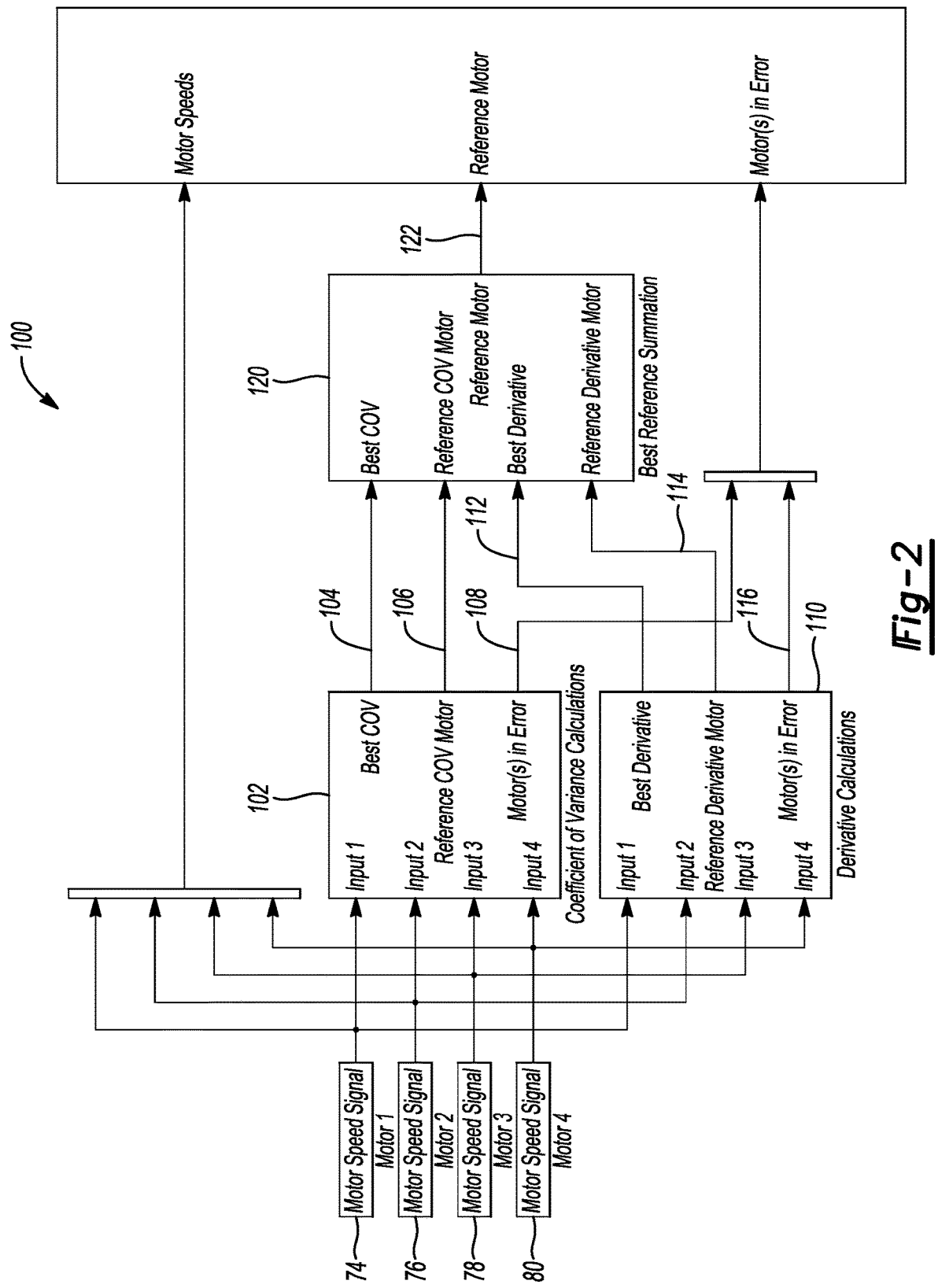
FIG. 2 is a control diagram of an algorithm for selecting a representative motor speed signal from multiple motor speed signals.

FIG. 2 illustrates a high-level control diagram 100 for determining a representative speed signal to be used, as well as identifying motor errors. Rather than using an average, or other combining technique, the representative speed signal is the measured speed output by one of the motor speed sensors that has been chosen as the most accurate indicator of actual motor speed. That representative motor speed is then used for subsequent calculations for controlling the vehicle 20. The controls 100 may determine the representative one of the motor speed sensors based on three main factors: (1) a variance of the motor speed signal; (2) a noise content of the motor speed signal; and (3) the selection of the representative speed sensor based on a weighted summation of the accumulated points assigned to each of the signals in parts 1 and 2 for a predetermined sampling duration.

The controller 72 receives the motor speed signals 74, 76, 78 and 80 at block 102. Block 102 determines the variances of each of these motor speed signals, determines a minimum one of the variances, and outputs the minimum variance with a tag of which motor the minimum variance is associated with. Box 102 also outputs an error message for any motor having a variance that exceeds a limit for example. Equation 1 shown below may be used to calculate the variance where $\omega_n$ is motor speed and n is the number of motor speed sensors on the vehicle.

$$\text{Variance}_{min} = \min\left(\left|\left(\frac{w_n}{\left(\sum_1^n w_n\right)/n}\right) - 1\right|\right) \qquad \text{Eq. 1}$$

Using equation 1, the controller calculates the variance for each of the four motor signals and chooses the minimum value as the output 104. The controller then outputs the motor associated with the output 104 as tag 106. That is, if the motor speed signal 74 had the minimum variance and is output at 104, the controller would identify motor 22 in tag 106.

The controller may identify errors in the motors at operation 102 using Coefficient of Variation (CV) statistical analysis for the motor speed. This CV is not to be confused with the above-described "variance" calculated using equation 1. CV is a ratio of the standard deviation to the mean, whereas the variance is a ratio of a measured speed to the mean. An error 108 may be flagged at operation 102 if one of the motor speed signals has a CV that exceeds a threshold for a given amount of counts during the sampling duration.

The controller 72 receives the motor speed signals 74, 76, 78 and 80 at block 110 that determines the noise content of each of these motor speed signals. The noise content may be determined by derivative logic using equation 2, where K is an adjustable gain and $T_S$ is the clock speed of the controller, e.g., 400 milliseconds.

$$\dot{w}_{min} = \left| \frac{K(w_n - 1)}{T_s\, w_n} \right| \qquad \text{Eq. 2}$$

The controller is programmed to determine the minimum one of the derivatives at block 110 and output the minimum derivative 112. The controller then outputs the motor associated with the output 112 as tag 114. The controller is also programmed to determine an error 116 for any of the motors having a derivative that is outside of threshold limits for a given amount of counts during the sampling duration.

The outputs of boxes 102 and 110 are output to box 120 that determines the one of the motors (referred to as a reference motor 122) to use as the representative motor speed signal, i.e., the speed sensor associated with the reference motor is the representative motor speed sensor. The reference motor is selected based on the weighted summation of accumulated points (for the predefined sampling duration) assigned for having the minimum variance and/or the minimum derivative for one of the loops. Each loop of the vehicle controller may execute these calculations, and the loops continue for the predefined sampling duration. After each loop is complete, the controller assigns a point to the motor associated with the minimum variance and a point to the motor with the minimum derivative. For example, in one loop, the motor 22 may receive two points if it has both the minimum variance and the minimum derivative, in which case all other motors receive zero points. The point awarded in each loop are tallied (a summation) throughout the sampling durination according to equation 3. When the sampling ends, the motor with the greatest amount of points is selected as the reference motor. In equation 3, α is a weighting term between 0 and 1, for example.

$$w_{rep} = \max[[\alpha * Icov_{min}]_n + (1-\alpha) * I\dot{w}_{min}]_n] \qquad \text{Eq. 3}$$

The controller may determine the reference motor at the initiation of a drive cycle. For example, the predefined sampling duration may occur following key-on (vehicle activation) when the electric motors are being operated at idle speed, e.g., 500 revolutions per minute (RPM). The sampling could also occur during steady-state driving. The predetermined sampling duration may be for a predetermined amount of time or for a predetermined number of cycles of the controller. During the sampling duration, the motors of the vehicle are awarded points at each cycle if that motor has a minimum variance and/or a minimum derivative. At the end of the sampling duration, the motor with the greatest number of points is selected as the reference motor and the speed sensor associated with that reference motor is used as the representative motor speed signal. Following the determination of a reference motor, that reference motor may be used for the duration of the drive cycle. Alternatively, the controller may redetermine the reference motor within a same drive cycle every time the electric machines are at idle speed, for example.

The motor speed signals are used to control a variety of vehicle commands including the torque commands to the electric machines, speed control of the electric machines, determining the driver-demanded torque, and protecting motor overspeed among others. To illustrate one use of the representative speed signal, an example speed control of the electric machines will now be described. In speed control, a target speed for the electric machines are set and the electric machines are commanded to reduce an error between measured speeds of the electric machines and the speed target. Here, the representative speed signal is used as the speed for all of the electric machines on the vehicle in determining the error. That is, all speed sensors except for the one associated with the reference motor are ignored during speed control and representative motor speed signal of the reference motor is used for the other motors.

FIG. 3 illustrates an example algorithm 150 for illustrating the concept of controlling multiple electric machines in speed control using a single representative motor speed signal (a measured speed of the reference motor). A motor speed controller 152 commands speeds (and/or a torque) to the motors, e.g., motors 22, 24, 26, and 28, based on a target motor speed 156 and an error. In the illustrated embodiment, all the electric motors are rotationally constrained to rotate at a same speed; therefore, each of the motors has the same target motor speed. A feedback loop is used to adjust the speed commands and reduce an error between the measured motor speed and the target motor speed. In the algorithm 150, only one of the four speed sensors is used in the feedback loop, that being the representative motor speed sensor that was selected as described above. The target motor speed 156 is compared to the representative motor speed 158 at summation block 160 to determine an error 162. The error 162 is provided to the motor speed controller 152, which includes logic for adjusting the speed commands to reduce the error. The motor speed controller 152 outputs a speed command 154 for the motors.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A control system for a vehicle having first and second electric machines configured to power a common axle, comprising:
a controller programmed to:
in response to the first and second electric machines being in speed control, command speeds to the first and second electric machines based on a difference between a target speed of the electric machines and a measured speed from a selected one of first and second speed sensors, wherein a ratio of speed values detected by the selected one and average speed values detected by the first and second sensors is less than the ratio of the other of the first and second sensors, and select the one of the first and second speed sensors by identifying one of the first and second speed sensors as having a greatest number of accumulated points for a predefined sampling duration, the accumulated points for each of the first and second speed sensor being based on the ratio.

2. The control system of claim 1, wherein the selected one of first and second speed sensors has a smaller noise factor than the other of the first and second speed sensors.

3. The control system of claim 2, wherein the noise factor is based on a ratio of the speed value divided by a product of the speed value and a clock speed of the controller.

4. The control system of claim 1, wherein the ratio is determined during a sampling period.

5. The control system of claim 1, wherein the predefined sampling duration is for a predefined number of loops of the controller, and wherein the accumulated points are a summation of points that are provided during each of the loops.

6. The control system of claim 5, wherein, for each of the loops, a point is awarded to the one of the first and second speed sensors having a smallest value of the variance.

7. The control system of claim 1, wherein the predefined sampling duration coincides with the electric machines at idle speed.

8. The control system of claim 1, wherein the predefined sampling duration coincides with the electric machines at steady state speed.

9. A vehicle comprising:
a driven axle;
first and second electric machines configured to power the driven axle, wherein the first and second electric machines have rotor shafts constrained to rotate in unison, and the first and second electric machines have first and second speed sensors, respectively; and
a controller programmed to:
in response to activation of the vehicle, select one of the first and second speed sensors having a greatest number of accumulated points for a predefined sampling duration, wherein the accumulated points for each of the first and second speed sensors is based on (i) a variance that is a ratio of a speed value for the speed sensor and an average speed value for both of the speed sensors and (ii) a noise factor associated with the speed sensor; and
in response to the electric machines being in speed control, command speeds to the first and second electric machines based on a difference between a target speed of the electric machines and a measured speed of the one of the first and second speed sensors but not the other of the first and second speed sensors.

10. The vehicle of claim 9, wherein the controller is further programmed to, in response to the electric machines being commanded to an idle speed, select one of the first and second speed sensors having a greatest number of accumulated points for a second predefined sampling duration occurring when at the idle speed, wherein the accumulated points of the second duration for each of the first and second speed sensors is based on (i) a variance that is a ratio of a speed value for the speed sensor and an average speed for both of the speed sensors and (ii) a noise factor associated with the speed sensor.

11. The vehicle of claim 9, wherein the controller is further programmed to, in response to the electric machines being at a steady-state speed that is less than a threshold, select one of the first and second speed sensors having a greatest number of accumulated points for a second predefined sampling duration occurring when at the steady-state speed, wherein the accumulated points of the second duration for each of the first and second speed sensors is based on (i) a variance that is a ratio of a speed value for the speed sensor and an average speed for both of the speed sensors and (ii) a noise factor associated with the speed sensor.

12. The vehicle of claim 9, wherein the noise factor is based on a ratio of the speed value divided by a product of the speed value and a clock speed of the controller.

13. The vehicle of claim 9, wherein the predefined sampling duration is for a predefined number of loops of the controller, and wherein the accumulated points are a summation of points that are awarded during each of the loops.

14. The vehicle of claim 13, wherein, for each of the loops, a point is awarded to the one of the first and second speed sensors having a lowest value of the variance, and a point is awarded to the one of the first and second speed sensors having a lowest value of the noise factor.

15. A method of controlling an electric vehicle having first and second electric machines, the method comprising:
selecting one of first and second speed sensors based on (i) a difference between a speed value for the that speed sensor and an average speed for both of the speed sensors and (ii) a noise factor associated with the one of the speed sensors;
commanding speeds to the first and second electric machine based on a difference between a target speed of the electric machines and a measured speed of the one of the first and second speed sensors but not the other of the first and second speed sensors; and
in response to the electric machines being commanded to an idle speed, selecting one of the first and second speed sensors having a greatest number of accumulated points for a first predefined sampling duration occurring when at the idle speed, wherein the accumulated points of the second duration for each of the first and second speed sensor is based on (i) a variance that is a ratio of a speed value for that speed sensors and an average speed for both of the speed sensors and (ii) a noise factor associated with that speed sensor.

16. The method of claim 15 further comprising, in response to the electric machines being at a steady-state speed that is less than a threshold, selecting one of the first and second speed sensors having a greatest number of accumulated points for a second predefined sampling duration occurring when at the steady-state speed, wherein the accumulated points of the second duration for each of the first and second speed sensor is based on (i) a variance that is a ratio of a speed value for that speed sensor and an average speed for both of the speed sensors and (ii) a noise factor associated with that speed sensor.

17. The method of claim 15, wherein the selecting one of first and second speed sensors is during a sampling period and is further selected based on an accumulated number of points awarded during the sampling period.

18. The method of claim 15, wherein the noise factor is based on a ratio of the speed value divided by a product of the speed value and a clock speed of the controller.

* * * * *